J. W. THOMPSON.
TRAP NEST.
APPLICATION FILED NOV. 11, 1911.

1,068,373.

Patented July 22, 1913.

2 SHEETS—SHEET 1.

Witnesses
Louis R. Heinrichs
John J. McCarthy

Inventor
James W. Thompson

By Victor J. Evans
Attorney

COLUMBIA PLANOGRAPH CO., WASHINGTON, D. C.

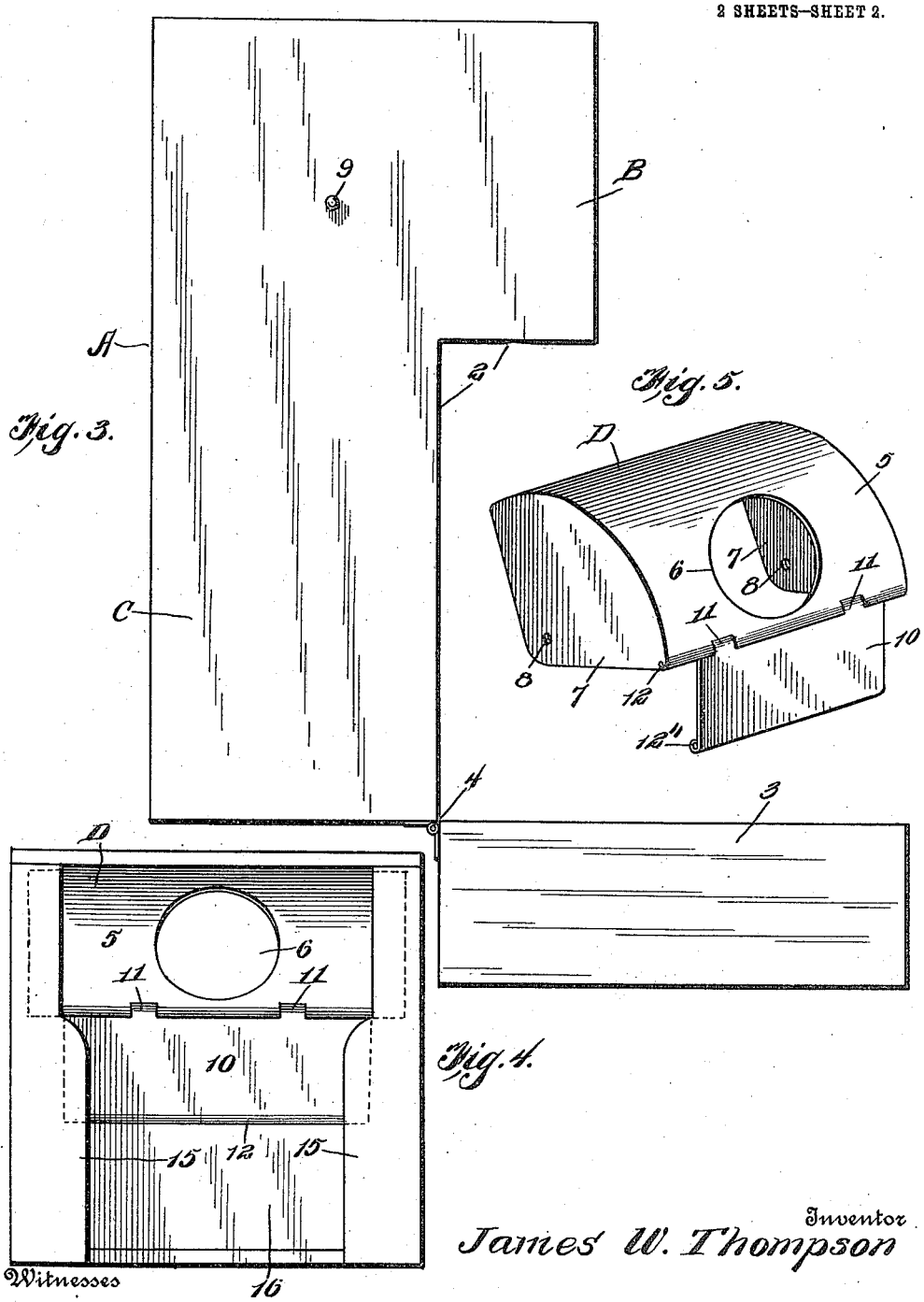

UNITED STATES PATENT OFFICE.

JAMES W. THOMPSON, OF CHAMPAIGN, ILLINOIS.

TRAP-NEST.

1,068,373.  Specification of Letters Patent.  Patented July 22, 1913.

Application filed November 11, 1911. Serial No. 659,762.

*To all whom it may concern:*

Be it known that I, JAMES W. THOMPSON, a citizen of the United States of America, residing at Champaign, in the county of Champaign and State of Illinois, have invented new and useful Improvements in Trap-Nests, of which the following is a specification.

The invention relates to improvements in trap nests and has for one of its objects to provide a nest of this character whereby upon the fowl entering the same, the nest shall be automatically closed to ingress and egress.

A further object of the present invention is the provision of a trap nest in which the nest box shall be mounted for swinging movement relative to the trap body and pivoted thereto so that the nest box may be cleaned when desired.

A still further object of the present invention is to provide a trap nest of this character which shall include a body portion divided into substantially two compartments, one of which forms what may be termed the entrance room, and the other the nest proper, the entrance room being provided with means adapted to cut off communication between said rooms and permit communication therebetween after the fowl has entered the nest.

A still further object of the present invention is the provision of a trap nest of this character whereby the entrance room shall be equipped with an automatic closure designed to be operated to closing position by the fowl upon the same leaving the entrance room and entering the nest.

With the above and other objects in view which shall appear as the description progresses, the invention consists in the construction, combination and arrangement of parts hereinafter described, the novel features of the invention being particularly pointed out in the appended claims.

Figure 1:
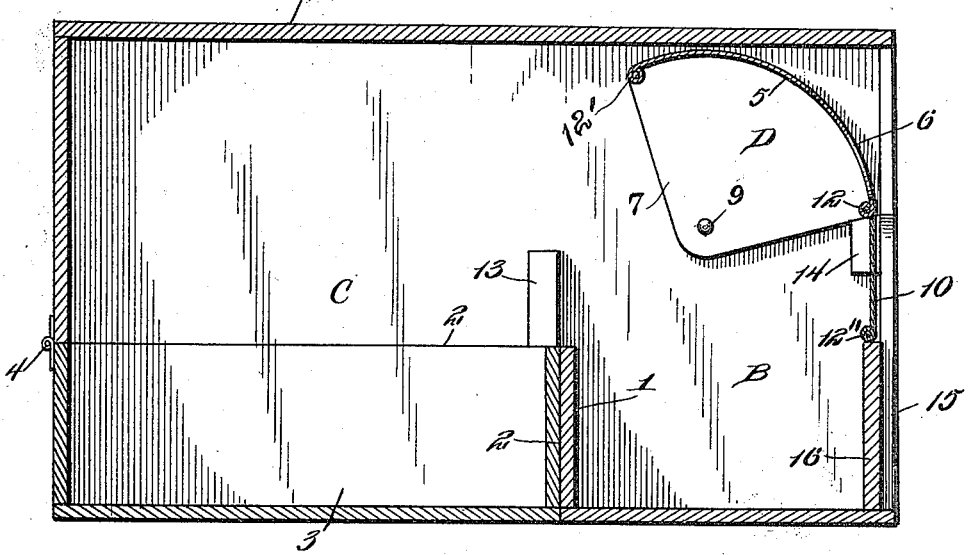
Figure 2:
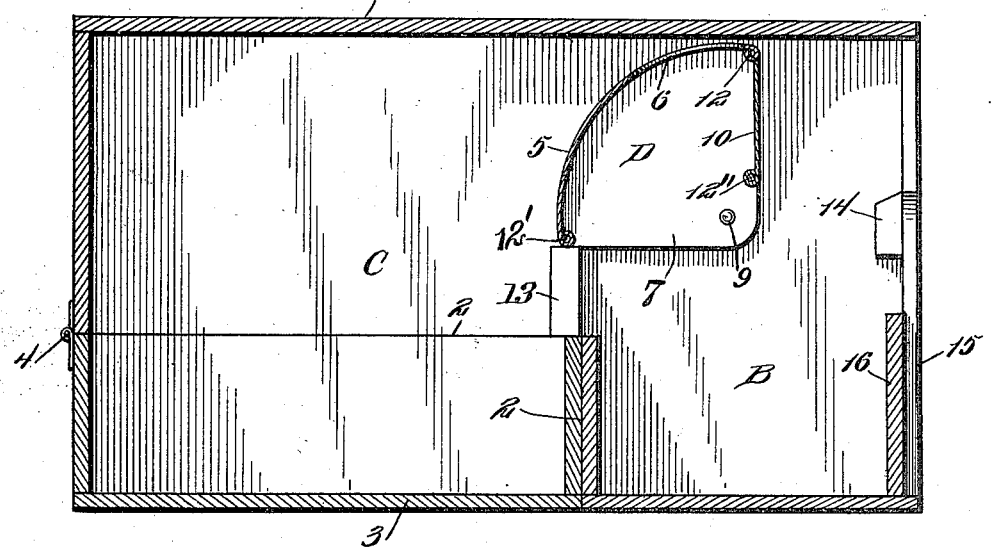

In the accompanying drawings forming a portion of this specification; Figure 1 is a longitudinal sectional view of a trap nest constructed in accordance with the present invention, the door or closure being shown in closed position. Fig. 2 is a similar view showing the door in open position. Fig. 3 is a side elevation of the same showing the nest box in open position. Fig. 4 is a front elevation of the same, and Fig. 5 is a detail perspective view of the door.

Similar reference characters designate like parts throughout the several views.

Referring more particularly to the accompanying drawings, wherein I have shown the preferred embodiment of the invention, A designates the body of rectangular outline and constructed of wood, metal or any other suitable or preferred material. The body A is divided into two compartments or rooms B and C, the room B forming the entrance compartment of the trap nest and into which the fowl enters previous to its entering the room C which latter forms the nest proper. The rooms B and C are of relatively different areas, the room C being of a greater area than the room B, and are separated from each other by means of a partition 1 arranged at the rear of the room B and extending upwardly from the floor thereof for a portion of its height. The side and rear walls of the compartment C have their lower portions cut away as at 2 to receive the nest box 3 which may be made of any suitable or preferred material, the floor of the nest box being adapted to aline with the floor of the room B in the closed position of the box. The nest box 3 has its rear end pivotally connected by means of hinges 4 to the rear end of the compartment C so that the box may be swung upon its hinges and out of the compartment C to facilitate cleaning or disinfecting of the box. The upper edge of the front wall of the nest box 3 is designed to aline with the similar edge of the partition 1 in the closed position of the box so as to present an unbroken surface to the feet of the fowl.

Pivoted to the sides of the entrance compartment B and adjacent its upper surface is a closure or door D which latter comprises a curved body portion 5 formed at its forward end with a centrally arranged opening 6 and provided upon opposite sides with depending tapering ears or supports 7 formed at their lower ends with apertures 8 designed to receive pivot pins 9 arranged in the sides of the room B. Depending from the forward end of the curved body portion 5 of the door D is an apron 10 connected to the said body portion by means of eyes 11 formed upon the upper surface of the apron and adapted to receive a pivot rod 12 carried by the forward end of the door D, the apron terminating short at each end of the ends of the body portion 5. The rear end of the door D is preferably turned upon itself to provide an abutting surface 12' and the free apron 10 is provided with a similar surface 12" the purpose of which will presently appear. Adjacent the rear end of the room B, the compartment C is provided with stop lugs 13 arranged upon each side thereof and having their upper surfaces in a plane above the plane of the partition 1, the room B at its forward end being provided with similar stop lugs 14 having their upper surfaces inclined and arranged in a plane slightly above the upper surfaces of the lugs 13. The lugs 13 and 14 are adapted to be engaged by the rear and front edges of the body portion 5 of the door in the closing and opening movement of the latter. From this construction it will be seen that upon the door D being pivoted to the sides of the room B by means of the ears or supports 7, the said door will be permitted to swing in an arcuate path upon the pivot pins 9 carried by the sides of the room B, the stops 14 and 13 serving to limit the swinging movement of the body portion 5 of the door.

The forward end of the room B is provided with stops 15 extending upwardly from the bottom thereof and terminating in alinement with the lugs 14 and adapted to be engaged by the opposite sides of the apron 10 in the closing of the door to limit the forward movement of the apron.

Projecting upwardly from the floor of the compartment B and immediately adjacent the lugs 15 is what may be termed a stationary closure 16, which latter terminates intermediate the height of the stops 15 and is designed to receive the lower end of the apron 10 in closed position of the door to coöperate with said apron to close the trap nest.

The operation of my invention is as follows; As shown in Fig. 2 the door D is in open position thereby permitting a fowl, such as a hen to enter the entrance room B. When the fowl enters the room B it will naturally step upon the partition 1 and in doing so its back will engage the abutting surface 12' of the door thereby rocking the door upon its pivot to closed position as illustrated in Fig. 1, in which position the apron 10 will engage the member 16 and prevent the ingress of other fowls and also the escape of the trapped fowl. When the hen wants to be released it will naturally come toward the opening 6 in the body portion 5 if the door through which light is being admitted to the nest, and enter the entrance room B. By applying pressure to the forward end of the body portion 5 with the thumb, and simultaneously lifting the apron 10 inwardly of the body portion 5, the room B may be opened to permit the escape of the hen, the door being thus moved to its innermost open position.

Having thus described my invention what I claim and desire to secure by Letters-Patent is:

1. A trap nest including a body divided into a nest compartment and an entrance compartment, said body having an entrance opening communicating with the entrance compartment and an opening connecting the two compartments, means adapted partially to close the opening between the compartments and to be actuated by a fowl when passing from the entrance compartment into the other compartment so as to be moved into a position partly closing the entrance compartment, and further independently-movable means carried by the first-named means for completely closing the entrance opening when in its outermost position.

2. A trap nest including a body divided into a nest compartment and an entrance compartment, said body having an entrance opening in communication with the entrance compartment and an opening connecting both compartments, means adapted partially to close the opening between the compartments, and to be actuated by a fowl when passing from the entrance compartment into the other compartment so as to move into a position partly closing the entrance compartment, means for supporting said closing means in either position, and further independently-movable closing means carried by the first-named closing means for completely closing the entrance opening when in its outermost position.

3. A trap nest comprising a body divided into a nest compartment and an entrance compartment, said body having an opening communicating between both compartments and an entrance opening in its front wall leading into the entrance compartment, a door comprising side portions pivoted to the side walls of the body within the entrance compartment and a longitudinally curved cross portion, means for supporting said door in its innermost position so that it partially closes the opening between the said compartments, means for supporting the said door in its outermost position with the front edge of its cross portion disposed above the horizontal plane of the door pivots, the door partially closing the entrance opening when in this position, and an apron hinged to the front edge of the door and adapted to be suspended so as to close the remaining portion of the entrance opening when the door is in its outermost position.

4. A trap nest comprising a body divided into a nest compartment and an entrance compartment, said body having an opening communicating between both compartments and an entrance opening in its front wall leading into the entrance compartment, a door comprising side portions pivoted to the side walls of the body within the entrance compartment and a longitudinally curved cross portion, means for supporting said door in its innermost position so that it partially closes the opening between the said compartments, means for supporting the said door in its outermost position with the front edge of its cross portion disposed above the horizontal plane of the door pivots, the door partially closing the entrance opening when in this position, an apron hinged to the front edge of the door and adapted to be suspended so as to close the remaining portion of the entrance opening when the door is in its innermost position, and means for limiting the outward movement of said apron when in its outermost position.

In testimony whereof I affix my signature in presence of two witnesses.

JAMES W. THOMPSON.

Witnesses:
 EDWIN FILSON,
 R. L. MAXSON.

---

Copies of this patent may be obtained for five cents each, by addressing the "Commissioner of Patents, Washington, D. C."